US007020309B2

(12) United States Patent
Bornes

(10) Patent No.: US 7,020,309 B2
(45) Date of Patent: Mar. 28, 2006

(54) METHOD OF RECOGNIZING FINGERPRINTS BY COLORING AND COMPUTER SYSTEM FOR IMPLEMENTING THE SAID METHOD

(75) Inventor: Luc Bornes, Cergy (FR)

(73) Assignee: SAGEM-SA, Paris (FR)

( * ) Notice: Subject to any disclaimer, the term of this patent is extended or adjusted under 35 U.S.C. 154(b) by 704 days.

(21) Appl. No.: 10/164,713

(22) Filed: Jun. 10, 2002

(65) Prior Publication Data

US 2002/0191821 A1 Dec. 19, 2002

(30) Foreign Application Priority Data

Jun. 13, 2001 (FR) .................................. 01 07745

(51) Int. Cl.
*G06K 9/00* (2006.01)

(52) U.S. Cl. ...................... 382/124; 382/125; 382/165; 340/5.53; 340/5.83

(58) Field of Classification Search ................ 382/124, 382/125, 165; 340/5.53, 5.83
See application file for complete search history.

(56) References Cited

U.S. PATENT DOCUMENTS 4,607,384 A 8/1986 Brooks
5,194,746 A 3/1993 Coen et al.
5,920,641 A * 7/1999 Ueberreiter et al. ........ 382/125
5,926,555 A * 7/1999 Ort et al. .................... 382/124
2003/0128240 A1* 7/2003 Martinez et al. ............ 345/764

FOREIGN PATENT DOCUMENTS

WO WO 01 11545 2/2001

OTHER PUBLICATIONS

Jagadeesh, JM; "Image Processing Software Image-Pro Plus 1.2"; Computer, IEEE Computer Society, Long Beach, California, USA; vol. 27, No. 9; Sep. 1, 1994; pp. 102-104.

* cited by examiner

*Primary Examiner*—Bhavesh M. Mehta
*Assistant Examiner*—John Strege
(74) *Attorney, Agent, or Firm*—Stites & Harbison PLLC; Ross F. Hunt, Jr.

(57) ABSTRACT

The method of recognizing fingerprints comprises an analysis step (21) in which an expert analyses characteristic points of a fingerprint image so as to be able to differentiate the fingerprint whose image is presented to him. The method comprises a modification step (19) in which the said print image available with various levels from a grey scale is modified into a second image in which at least one grey range of the first image is parameterized so as to be represented with various levels from a colour scale. The modification makes it possible to identify the characteristic points on an unknown fingerprint image more accurately and also to compare the said image to other known fingerprint images more easily.

10 Claims, 3 Drawing Sheets

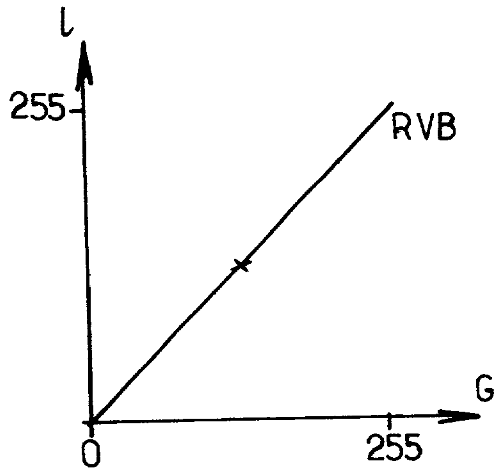
FIG.3a
FIG.3b
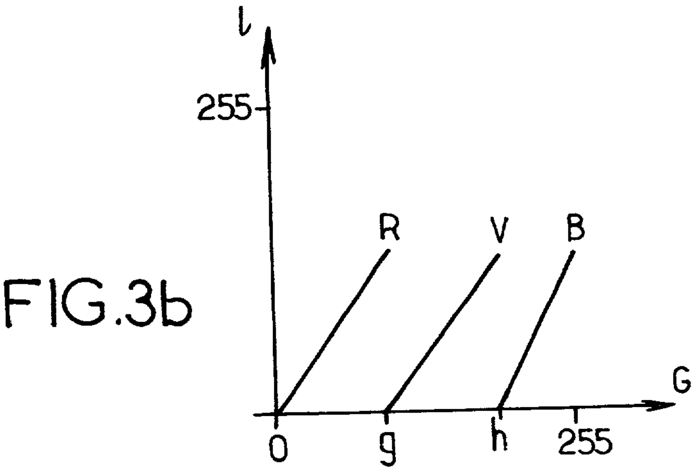
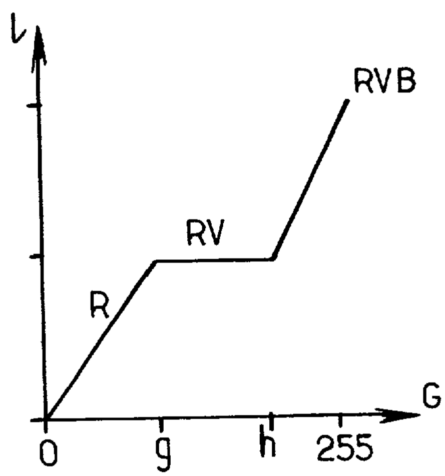
FIG.3c

METHOD OF RECOGNIZING FINGERPRINTS BY COLORING AND COMPUTER SYSTEM FOR IMPLEMENTING THE SAID METHOD

The field of the invention is that of recognizing fingerprints.

The recognition of fingerprints is commonly used to identify a person by his fingerprints.

BACKGROUND OF THE INVENTION

A fingerprint database generally lists many fingerprint images with, for each one, a set of characteristic points and a match with the identity of the person to whom the fingerprint is assigned.

A fingerprint image consists of a number of lines of varying darkness separated by lines of varying lightness with line ends and line bifurcations which form the characteristic points of the fingerprint.

In order to establish a one-to-one match between an image which results from a print mark of unknown identity and a print image from the database, the method is carried out overall as follows. The unknown print image is presented to an expert who determines characteristic points of the unknown print. The unknown print image with its specified characteristic points is submitted to a computer system which compares it with the images from the database, with their characteristic points. From among the images in the database, the computer system selects a sample of those that are considered, in a known manner, by an algorithm to be closest to the submitted image. The images selected by the computer system are then presented to the expert who compares them with the unknown print image so as to find a match of the unknown print image with a print image from the database.

On an image, available with various levels in a grey scale in order to show the ridges of a fingerprint, the distribution between light lines and dark lines is sometimes difficult to assess. So as to relieve the work of the expert when sorting through the images of a sample put forward, the computer system is generally designed to select a sample containing a limited number of images.

To do this, some images are rejected as soon as their similarity with the submitted image differs, even a little, therefrom. This is a drawback since there is a risk that relevant images are rejected, with the risk that the fingerprint image which actually matches that of the submitted image is not presented to the expert. The expert then spends needless energy observing a sample which does not contain the image sought.

On the other hand, the difficulty in accurately assessing the passage from a dark line to a light line may generate errors in detection and/or positioning of characteristic points on the unknown print image. Since the computer system then compares characteristic points of the unknown print with those of a database, there is a risk of rejecting a relevant database print because of these errors. Before submitting the fingerprint image with its characteristic points to the computer system, the expert must therefore pay close attention to analysing the unknown print in order to determine the characteristic points, thereby minimizing the risk of errors.

Increasing the size of the sample with fewer comparison restrictions decreases the risk of rejecting the relevant image. However, scrutiny of a considerably high number of images displayed with levels from a grey scale increases the fatigue of the expert and risks decreasing his productivity.

SUMMARY OF THE INVENTION

So as to facilitate the task of the expert, a first subject of the invention is a method of recognizing fingerprints comprising a transformation step in which a first print image available with various levels from a grey scale is modified into a second image representing the first image, in which at least one grey range of the first image is parameterized so as to be represented with various levels from a colour scale.

This makes it possible to enhance the perception of variations in brightness and contrast in the transformed grey range and to better distinguish the details of this grey range with respect to the rest of the image.

Thus, in an analysis step of the method, in which the expert analyses characteristic points of a fingerprint image so as to be able to identify the fingerprint whose image is presented to him, the attention of the expert can be focused on the coloured parts with less effort.

The increase in contrast provided by the colours enables the expert to determine the characteristic points of the unknown fingerprint more accurately before submitting the image thereof to the computer system for comparison with database images. This increases the comparison performance of the computer system by reducing the error rate.

It is then more easily possible to keep strict comparison restrictions and thus reduce the size of the sample selected by the computer system.

In a final phase of selecting the fingerprint from the sample by the expert, his task is facilitated by the reasonable size of the sample, combined with the display, enhanced by the colours, of the fingerprints put forward.

The method is further improved by assigning other colours to other grey ranges.

Another subject of the invention is a computer system which comprises means for displaying a fingerprint image and means for transforming each level from a grey variation range into a level from a colour variation range.

DESCRIPTION OF THE DRAWINGS

Other particular features and advantages of the present invention will become apparent from the description of exemplary embodiments provided by way of illustration, with reference to the appended drawings, in which:

FIG. 3*a* demonstrates the separating power of the eye for an image coded over various grey levels;

FIGS. 3*b* and 3*c* demonstrate the separating power of the eye for an image transformed by the method according to the invention.

DESCRIPTION OF PREFERRED EMBODIMENTS

Figure 1:
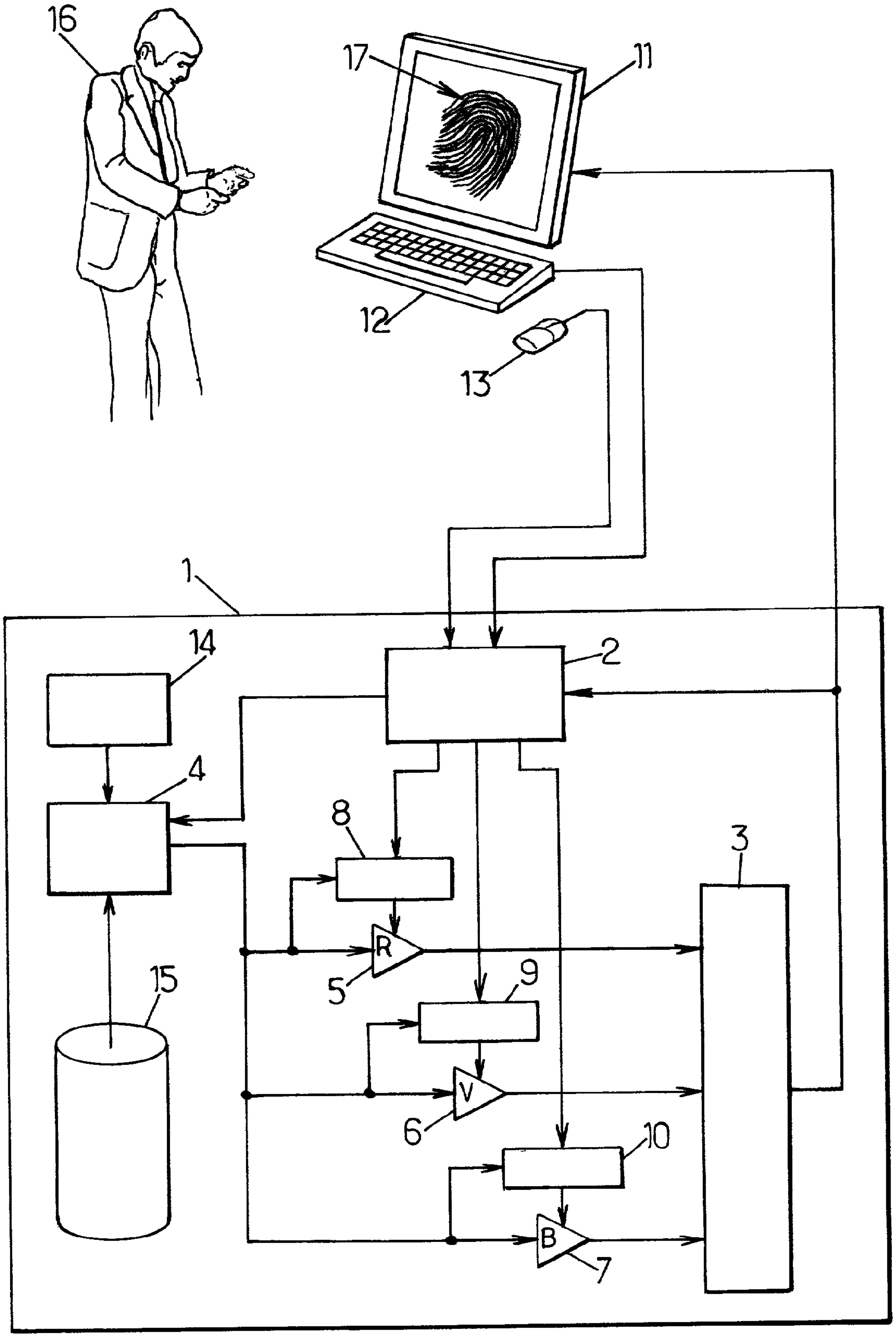
FIG. 1 shows a computer system according to the invention.

With reference to FIG. 1, a computer system 1 comprises a command interpreter 2 and a display driver 3. Operator interface means enable a human 16 to interact with the computer system 1. The operator interface means comprise control means such as a keyboard 12, a mouse 13 and display means such as a screen 11.

The command interpreter 2 is provided in order to receive, at the input, first signals which come from the control means. The display driver 3 is provided in order to generate, in a known manner, second signals intended for the display means. An image displayed on the screen 11 consists of a mosaic of elementary points commonly called pixels. Since the screen 11 is a colour screen, the light emitted by each pixel has, in a known manner, an intensity encoded over three values. In a hue, saturation, brightness colour space, the hue varies from orange-red to violet-red, passing through yellow, turquoise blue and magenta, the saturation varies from the grey common to all the hues at the most vivid values which contrast sharply from one hue to another, and the brightness varies from black (absence of light) to white (full light). Thus, for a black-and-white image with grey shades, the saturation is zero, the hue values have no effect on the perception by the eye, a zero brightness value means that black is perceived, a maximum brightness value means that white is perceived, and between the extreme brightness values, each value means that a level from a grey scale is perceived.

In a Red-Green-Blue colour space, a zero intensity of light emitted in the three colours Red, Green and Blue gives the eye the same perception of black as in the hue, saturation, brightness space, and a maximum intensity of light emitted in the three colours Red, Green and Blue gives the eye the same perception of white as in the hue, saturation, brightness space. A maximum intensity of light emitted in the colour red with a zero intensity in the colours green and blue gives the eye the same perception as the red hue called orange-red or violet-red with a maximum saturation value and a substantially medium brightness value in the hue, saturation, brightness space. All colours of the hue, saturation, brightness space can be attained with intensity values of light emitted in each of the colours Red, Green and Blue.

Each pixel of the screen 11 comprises an equal number of light points of variable intensity for each of the colours Red, Green and Blue. In a known manner, in the field of colour electroluminescent screens, the second signals generated by the display driver 3 encode values of light intensity in each of the three colours, in synchronization with scanning of the screen 11. An image producer 4 is provided in order to produce fingerprint images from a database 15 or from an input device 14.

The database 15 contains fingerprint images encoded numerically in a grey scale, the various levels from the lightest to the darkest of which enable the fingerprint lines to be represented.

The image producer 4 is arranged to extract one or more images from the database 15 and to generate a signal encoded numerically in the RGB (Red, Green, Blue) colour space so that each image extracted can be displayed on the screen 11 by means of the driver 3. The signal generated by the image producer 4 has values in order to encode each level in the grey scale. Each grey level is encoded, for example, by means of an eight-bit word which defines the same intensity value of light emitted in red, green and blue. In a known manner, the same intensity value of light emitted in the red, the green and the blue is perceived by the human eye with zero saturation and a brightness which increases with the light intensity value with no perception of hue. Thus, eight bits make it possible to encode $2^8$, that is 256 levels in a grey scale. A greater number of bits enables a greater number of levels in the grey scale to be encoded, varying according to the corresponding power of two.

In the system 1 according to the invention, the signal generated by the image producer 4 is supplied to three amplifiers 5, 6, 7, each assigned respectively to one colour, Red, Green or Blue. The output from each amplifier 5, 6, 7 sends to the display driver 3 a light intensity value to be emitted respectively in red, green and blue. A register device

8, 9, 10, which contains at least one threshold value and two groups of gain parameters, is associated with each amplifier 5, 6, 7, respectively. The register device 8, 9, 10 receives at the input the input signal from the respectively associated amplifier 5, 6, 7, so as to drive the amplifier with which it is associated with a gain resulting from the first group of parameters when the signal at the input of the amplifier is less than the threshold value and with a gain resulting from the second group of parameters when the signal at the input of the amplifier is greater than the said threshold value.

For example, each register device contains two threshold values g, h and six coefficients a, b, c, d, e, f for linear functions such that a value y of the signal at the output of the associated amplifier is determined by the equation:

$$y=ax+b$$

for a signal x at the amplifier input which is less than the first threshold value g;

$$y=cx+d$$

for a signal x at the amplifier input which is greater than the first threshold value and less than the second threshold value h;

$$y=ex+f$$

for a signal x at the amplifier input which is greater than the second threshold value h.

Each of the coefficients a, b, c, d, e is positive, negative or zero. Furthermore, the amplifiers 5, 6, 7 are such that the signal y at the output is limited between a zero value and a maximum value of light intensity to be emitted.

In the register device 8, for example, a value of the first threshold g at zero has the same effect as if there were a single threshold g at zero with a first group of parameters of gain c, d and a second group of parameters of gain e, f. Zero values of coefficients e and f have the effect of a constant gain at zero for values x of the input signal greater than the threshold value h. A zero value of the coefficient d and a value of the coefficient c equal to 255/h causes the value y of the output signal to vary from 0 to 255 when the value x of the input signal varies from 0 to h.

The command interpreter 2 is designed to load values into the register devices 8, 9, 10, such as the threshold values and linear function coefficients. The values loaded are prepared from commands and data communicated to the command interpreter from the operator interface, for example by means of the keyboard 12 or the mouse 13; the command interpreter 2 then also receives components of the image displayed on the screen 11 in order to determine coordinates of a mouse pointer on the screen.

The image producer 4 is also connected to an input/output device 14 in order to enable a fingerprint image other than those already contained in the database 15 to be loaded.

The command interpreter 2 is connected to the image producer 4 so as to generate image signals which come from the database 15 or from the input/output device 14, in response to commands communicated by the operator interface to the command interpreter 2.

Figure 2:
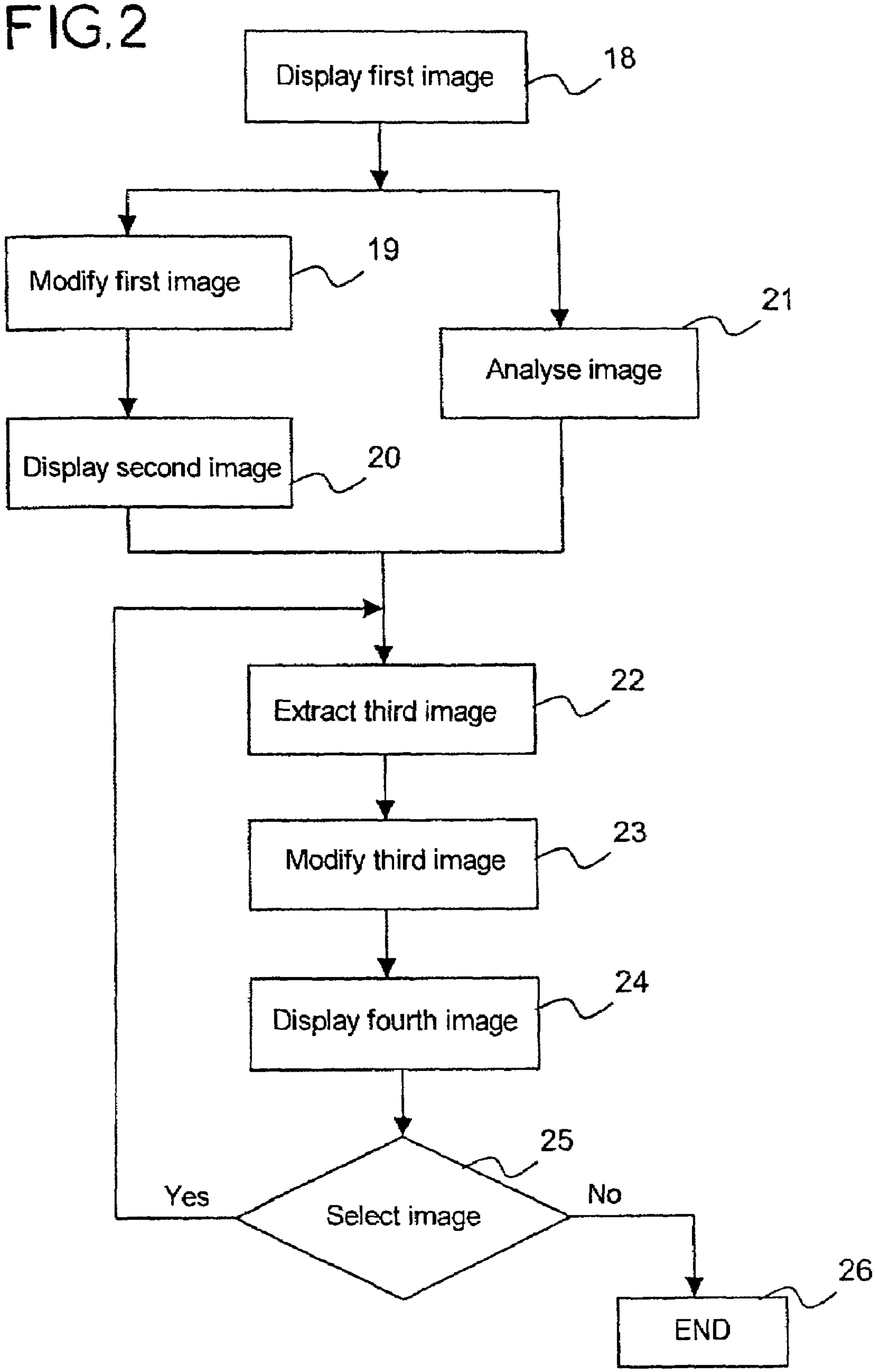
FIG. 2 shows various steps of a method according to the invention.

With reference to FIG. 2, a method according to the invention comprises a step 18 in which a first image is displayed on the screen 11. The first image is that of a fingerprint of unknown identity communicated to the system 1 by the input/output device 14. The expert 16 commands the image producer 4 to generate the signal which encodes the first image. The first image resulting from a print mark is generally encoded in a grey scale. Initially, the threshold values g, h and the values of constant coefficients b, d, f are all at zero, and the values of multiplying coefficients a, c, e are all at one in each of the register devices 8, 9, 10. Thus the gain of the amplifiers 5, 6, 7 is one and the first fingerprint image is presented to the expert 16 as available with various levels from a grey scale, for example in a first window of the screen 11.

In a step 19, the expert 16 opens a second window which presents, in graphic or text form, an image display parameterization in order to modify the first image. With reference to FIG. 3*a*, an example of a second window demonstrates the separating power of the eye for an image encoded on a grey scale by means of an eight-bit word. On the X-axis, the grey levels go from zero for black to 255 for white. On the Y-axis, the brightness varies proportionally from zero to 255. Each point of the encoded image is on a straight line with a leading coefficient of one, and with identical values for each Red, Green and Blue colour component. The separating power of the eye acts in a single dimension of the colour space, that is the brightness. By means of the mouse or of the keyboard, the expert 16 can modify the curve of FIG. 3*a* in order to obtain different colour parameterizations such as those shown, for example, in FIGS. 3*b* and 3*c*.

In FIG. 3*b*, the red component varies from zero to 255 for grey levels varying from zero to 85, and drops back to zero for grey levels greater than the threshold g with a value of 85. The green component is zero for grey levels less than the threshold g with a value of 85 or greater than the threshold h with a value of 170. The green component varies from zero to 255 for grey levels varying from 85 to 170. The blue component is zero for grey levels less than the threshold h with a value of 170 and varies from zero to 255 for grey levels varying from 170 to 255.

In FIG. 3*c*, the red component varies from zero to 255 for grey levels varying from zero to 85, then remains constant at 255 for grey levels greater than 85. The green component, which is zero for grey levels less than 85, varies from zero to 255 for grey levels varying from 85 to 170, then remains constant at 255 for grey levels greater than 170. The blue component, which is zero for grey levels less than 170, varies from zero to 255 for greater grey levels varying from 170 to 255.

It should be noted that when a single colour component varies from the minimum of zero to the maximum (in this case 255) with the other two components at zero, the brightness varies from zero to a mid-value (in this case 128), as can be observed in FIG. 3*b*. When a colour component varies from the minimum of zero to the maximum (in this case 255) with one other component at zero and another component at its maximum value (255), the brightness remains constant at the mid-value (128) with a variation in the hue.

In response to the modifications carried out by the expert 16 on the curve of the second window by means of the mouse or of the keyboard, the command interpreter 2 loads the suitable values into the register devices 8, 9, 10.

In the example of FIG. 3*b*, the command interpreter 2 loads the values 85 and 170 for the thresholds g and h, respectively, of each register device 8, 9, 10. The command interpreter 2 loads the value zero for the coefficients b, c, d, e, f of the device 8, for the coefficients a, b, e, f of the device 9 and for the coefficients a, b, c, d of the device 10. The command interpreter 2 loads the value three for the coefficient a of the device 8, for the coefficient c of the device 9 and for the coefficient e of the device 10, the value −255 for the coefficient d of the device 9 and the value −510 for the coefficient f of the device 10.

In the example of FIG. 3*c*, the values loaded by the command interpreter 2 are identical except for the values d, f of the device 8 and the values f of the device 9 which are loaded at 255.

The expert may act as he pleases in order to obtain modified curves other than those of FIGS. 3*b* and 3*c*. A person skilled in the art of computing will program the command interpreter 2, without any particular difficulty, in order to transcribe the commands received from the operator interface in the form of values to be loaded into the devices 8, 9, 10.

Thus, in a step 20, the fingerprint image is displayed, for example, in a third window with the colours resulting from step 19.

The geometrical properties of the image displayed in the third window are identical to those of the image displayed in the first window; only the colours of this image are modified. The image of the third window simply consists of a display in which the colours of the image differ from those of the first window. In particular, markers on the first image for identifying the characteristic points have the same coordinates on the second image displayed in the third window. These markers may result from automatic encoding of the unknown print image by the image producer 4 which, receiving the unknown print image from the input/output device 14, makes use of software for recognizing discontinuities in the grey scales.

Step 20 may be executed simultaneously with step 19 so that the expert can see, in the third window, the effects produced by the modifications which he has made in the second window.

In the case of FIG. 3*b*, the expert observes regions varying from black to vivid red for regions of the original image which vary from black to dark grey, regions varying from black to vivid green for regions of the original image which vary from dark grey to light grey, and regions varying from black to vivid blue for regions of the original image which vary from light grey to white.

In the case of FIG. 3*c*, the expert observes regions varying from black to vivid red for regions of the original image which vary from black to dark grey, regions varying from vivid red to vivid yellow passing through orange hues for regions of the original image which vary from dark grey to light grey, and regions varying from vivid yellow to white for regions of the original image which vary from light grey to white.

The separating power of the human eye is increased since the distinction between the points of the image is no longer carried out using the brightness dimension of a grey scale alone but using two dimensions, hue and brightness.

Thus, in a step 21, carried out in parallel with or independently of steps 19 and 20, the expert 16 analyses the image displayed in the third window more easily in order to determine the characteristic points of the fingerprint.

The expert can modify the colour space during the analysis so as to accentuate certain details of the image which are more difficult to assess. Benefiting from a display in a colour space with two-dimensions of brightness and hue, the expert then manually places the markers which identify the characteristic points with great accuracy. If the markers have automatically been placed beforehand by the image producer 4, the expert moves them by means, for example, of the mouse 13 so as to position them with great accuracy. The improvement in the quality of the encoding of the unknown print image which results therefrom increases the chances of automatic recognition in the following steps.

In a step 22, the characteristic points of the fingerprint of unknown identity enable the image producer 4 to extract, from the database 15, a third image which the image producer 4 detects with characteristic points similar to those of the fingerprint of unknown identity.

In a step 23, the third image is modified by the amplifiers 5, 6, 7, with the parameters kept in the devices 8, 9, 10, into a fourth image. This makes it possible to homogenize the various views of the fingerprint image.

In a step 24, the fourth image is displayed in a fourth window such that the expert can compare it easily with the image displayed in the third window.

In a step 25, if the expert selects the fourth image as being that of a fingerprint identical to the fingerprint of unknown identity, the recognition method is finished in a step 26. Since the database 15 contains an identity of an individual associated with the fingerprint, for each third image, the identity of the fingerprint of the first image becomes known. Here again, the selection by the expert is facilitated by the representation of the fingerprint images which, from a display made in a one-dimensional colour space, of brightness, over a grey scale is modified into a display mode in a two-dimensional colour space, of hue and brightness.

If the expert does not select the fourth image as being that of a fingerprint identical to the fingerprint of the second image, the method is reiterated from step 22 until a match at step 25 is found.

In the modification step of the method described, since a grey level of the first image is encoded by three identical values of three components, red, green and blue, it is possible to amplify the value of a first component in a first grey range and to cancel it outside the said first grey range. It is also possible to amplify a second component in a second grey range and to cancel it outside the said second grey range. It is again possible to amplify a third component in a third grey range and to cancel it outside the said third grey range. In the analysis step, markers for identifying characteristic points are advantageously placed on the said second image which represents an unknown fingerprint. In the iteration step, the parameterization of each grey range is advantageously stored so as to be applied to several known fingerprint images and compared to the unknown fingerprint image.

The computer system described above makes it possible to distinguish one or more fingerprint images by virtue of the producer of fingerprint images encoded with various levels from a grey scale and of the means for modifying a first image received from the image producer into a second image encoded with various levels from a hue scale and various levels from a brightness scale, and for communicating the said second image to the display driver. Advantageously, the command interpreter makes it possible to parameterize the said means according to orders received from the operator interface so as to amplify one or more components of a grey level in a saturated colour space. The image producer also makes it possible to extract, from the database containing fingerprint images, a third image intended for the modification means in response to a signal received from the command interpreter. The means for modifying the first or the third image comprise, for example, three amplifiers 5, 6, 7 in order for each one to respectively amplify a fundamental colour component.

What is claimed is:

1. A method of recognizing fingerprints comprising the following steps:

displaying a first fingerprint image, representing a first fingerprint, available with various levels from a grey scale;

modifying said first image to produce a second fingerprint image in which at least one grey range of the first image is parameterized with a set of parameters so as to be represented with various levels from a color scale;

analyzing characteristic points of the second fingerprint image;

extracting a third fingerprint image from a database based on said characteristic points;

modifying said third image with said set of parameters to produce a fourth fingerprint image; and comparing the second and fourth images and determining if the first fingerprint corresponds to the fingerprint represented in the fourth image.

2. A method of recognizing fingerprints according to claim 1, wherein, in the modification step, a grey level of the first image is encoded by three identical values of three components, red, green and blue, and the value of a first component is amplified in a first grey range and canceled outside the first grey range.

3. A method of recognizing fingerprints according to claim 2, wherein, in the modifying step, the value of a second component is amplified in a second grey range and canceled outside the second grey range.

4. A method of recognizing fingerprints according to claim 3, wherein, in the modifying step, the value of a third component is amplified in a third grey range and canceled outside the third grey range.

5. A method of recognizing fingerprints according to claim 4, wherein in the analyzing step, markers for identifying characteristic points are placed on said second fingerprint image which represents an unknown fingerprint.

6. A method of recognizing fingerprints according to claim 5, further comprising an iteration step in which the parameterization of each grey range is stored so as to be applied to several known fingerprint images and compared with the unknown fingerprint image.

7. A computer system for differentiating one or more fingerprint images, comprising:

an image producer for producing fingerprint images encoded with various levels from a grey scale;

a display driver for presenting on a screen fingerprint images communicated thereto;

image modifying means for modifying, with a set of parameters, a first fingerprint image received from the image producer so as to produce a second fingerprint image encoded with various levels from a hue scale and various levels from a brightness scale, and for communicating said second fingerprint image to the display driver;

means for analyzing characteristic points of the second fingerprint image;

means for extracting a further fingerprint image from a database based on said characteristic points;

means for comparing said second fingerprint image and said further fingerprint image, said further fingerprint image being modified by said image modifying means with said set of parameters prior to being compared with said second fingerprint image.

8. A computer system according to claim 7, further comprising a command interpreter for parameterizing the image modifying means according to instructions received from an operator interface so as to amplify one or more components of a grey level in a saturated color space.

9. A computer system according to claim 8, comprising a database, containing fingerprint images, from which said producer extracts a third image intended for modification by said image modifying means in response to a signal received from the command interpreter.

10. A computer system according to claim 9 wherein the image modifying means for modifying the first or the third image comprises three amplifiers each for respectively amplifying a fundamental color component.

* * * * *